(12) United States Patent
Stein et al.

(10) Patent No.: US 6,865,661 B2
(45) Date of Patent: Mar. 8, 2005

(54) RECONFIGURABLE SINGLE INSTRUCTION MULTIPLE DATA ARRAY

(75) Inventors: Yosef Stein, Sharon, MA (US); Joshua A. Kablotsky, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 335 days.

(21) Appl. No.: 10/141,567

(22) Filed: May 8, 2002

(65) Prior Publication Data

US 2003/0140211 A1 Jul. 24, 2003

Related U.S. Application Data

(60) Provisional application No. 60/350,398, filed on Jan. 21, 2002.

(51) Int. Cl.[7] .............................................. G06F 15/80
(52) U.S. Cl. .......................................... 712/15; 712/22
(58) Field of Search ............................. 712/15, 16, 20, 712/22, 21, 11

(56) References Cited

U.S. PATENT DOCUMENTS

| | | |
|---|---|---|
| 3,303,477 A | 2/1967 | Voigt |
| 3,805,037 A | 4/1974 | Ellison |
| 4,722,050 A | 1/1988 | Lee et al. |
| 4,847,801 A | 7/1989 | Tong |
| 4,852,098 A | 7/1989 | Brechard et al. |
| 4,918,638 A | 4/1990 | Matsumoto et al. |
| 5,095,525 A | 3/1992 | Almgren et al. |
| 5,182,746 A * | 1/1993 | Hurlbut et al. ............. 370/463 |
| 5,214,763 A | 5/1993 | Blaner et al. |
| 5,379,243 A | 1/1995 | Greenberger et al. |
| 5,386,523 A | 1/1995 | Crook et al. |
| 5,446,850 A | 8/1995 | Jeremiah et al. |
| 5,577,262 A * | 11/1996 | Pechanek et al. ............. 712/11 |
| 5,689,452 A | 11/1997 | Cameron |
| 5,832,290 A | 11/1998 | Gostin et al. |
| 5,996,057 A | 11/1999 | Scales, III et al. |
| 6,049,815 A | 4/2000 | Lambert et al. |
| 6,199,086 B1 | 3/2001 | Dworkin et al. |
| 6,199,087 B1 | 3/2001 | Blake et al. |
| 6,223,320 B1 | 4/2001 | Dubey et al. |
| 6,230,179 B1 | 5/2001 | Dworkin et al. |
| 6,246,768 B1 | 6/2001 | Kim |
| 6,317,819 B1 * | 11/2001 | Morton ........................ 712/22 |
| 6,349,318 B1 | 2/2002 | Vanstone et al. |

(List continued on next page.)

FOREIGN PATENT DOCUMENTS

EP          1 246 389 A1    10/2002

OTHER PUBLICATIONS

Viktor Fischer, *Realization of the Round 2 AES Candidates Using Altera FPGA*, (Jan. 26, 2001) <http://csrc.nist.gov/CryptoToolkit/aes/roun2/conf3/papers/24–vfischer.pdf> (Micronic—Kosice, Slovakia).

(List continued on next page.)

*Primary Examiner*—Henry W. H. Tsai
(74) *Attorney, Agent, or Firm*—Iandiorio & Teska

(57) ABSTRACT

A reconfigurable single instruction multiple data array includes a plurality of processing cells; a serial data bus with at least one line dedicated to each cell; each cell including an identification number for uniquely identifying each cell and its dedicated line and a communication port including at least one parallel to serial transmitter circuit in each cell for broadcasting its cell's output data over its dedicated line; at least one serial to parallel receiver circuit in each cell; each cell responsive to the identification number and a common command word to generate a local configuration command designating a pre-selected broadcasting cell and a configuration register associated with each receiver circuit and responsive to the local configuration command to condition its receiver's circuit to receive serial input data broadcast from the pre-selected cell's dedicated line.

7 Claims, 6 Drawing Sheets

U.S. PATENT DOCUMENTS

| | | |
|---|---|---|
| 6,434,662 B1 | 8/2002 | Greene et al. |
| 6,587,864 B2 | 7/2003 | Stein et al. |
| 2002/0041685 A1 | 4/2002 | McLoone et al. |
| 2002/0147825 A1 | 10/2002 | Stein et al. |
| 2003/0103626 A1 | 6/2003 | Stein et al. |
| 2003/0105791 A1 | 6/2003 | Stein et al. |
| 2003/0110196 A1 | 6/2003 | Stein et al. |
| 2003/0115234 A1 | 6/2003 | Stein et al. |
| 2003/0133568 A1 | 7/2003 | Stein et al. |
| 2003/0140212 A1 | 7/2003 | Stein et al. |
| 2003/0140213 A1 | 7/2003 | Stein et al. |
| 2003/0149857 A1 | 8/2003 | Stein et al. |

OTHER PUBLICATIONS

Máire McLoone and J.V. McCanny, *High Performance Single–Chip FPGA Rijndael Algorithm Implementations*, CHES 2001 Proc, LNCS 2162, 65–76 (ç.K. Koç et al. eds. May 16, 2001).

elixent, *Changing the Electronic Landscape* (2001) <http://www.elixent.com> (elixent—Bristol, UK).

elixent Application Note *JPEG Codec* (Dec. 9, 2002) <http://www.elixent.com/assets/jpeg–coder.pdf> (elixent—Bristol, UK).

U.S. Appl. No. 10/440,330, filed May 16, 2003, Stein et al.

U.S. Appl. No. 10/395,620, filed Mar. 24, 2003, Stein et al.

V. Baumgarte et al., *PACT XPP—A Self–Reconfigurable Data Processing Architecture* (Jun. 2001) <http://www.pact-corp.com/xneu/download/ersa01.pdf> (PACT XPP—Santa Clara, CA).

PACT Informationstechnologie GmbH, *The XPP White Paper Release 2.1* (Mar. 27, 2002) <http://www.pactcorp.com/xneu/download/xpp_white_paper.pdf> (PACT XPP—Santa Clara, CA).

* cited by examiner

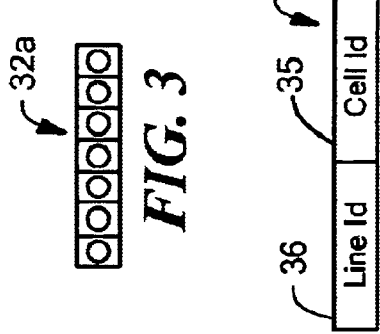
FIG. 3
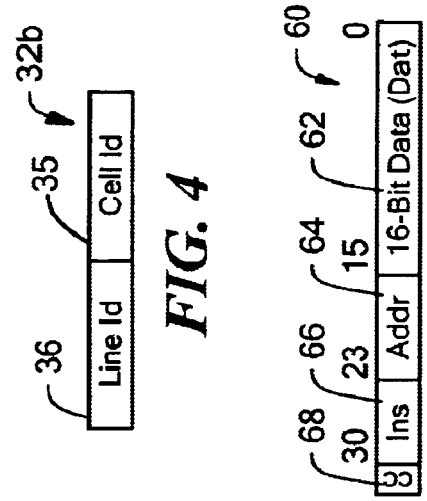
FIG. 4
FIG. 5
FIG. 6
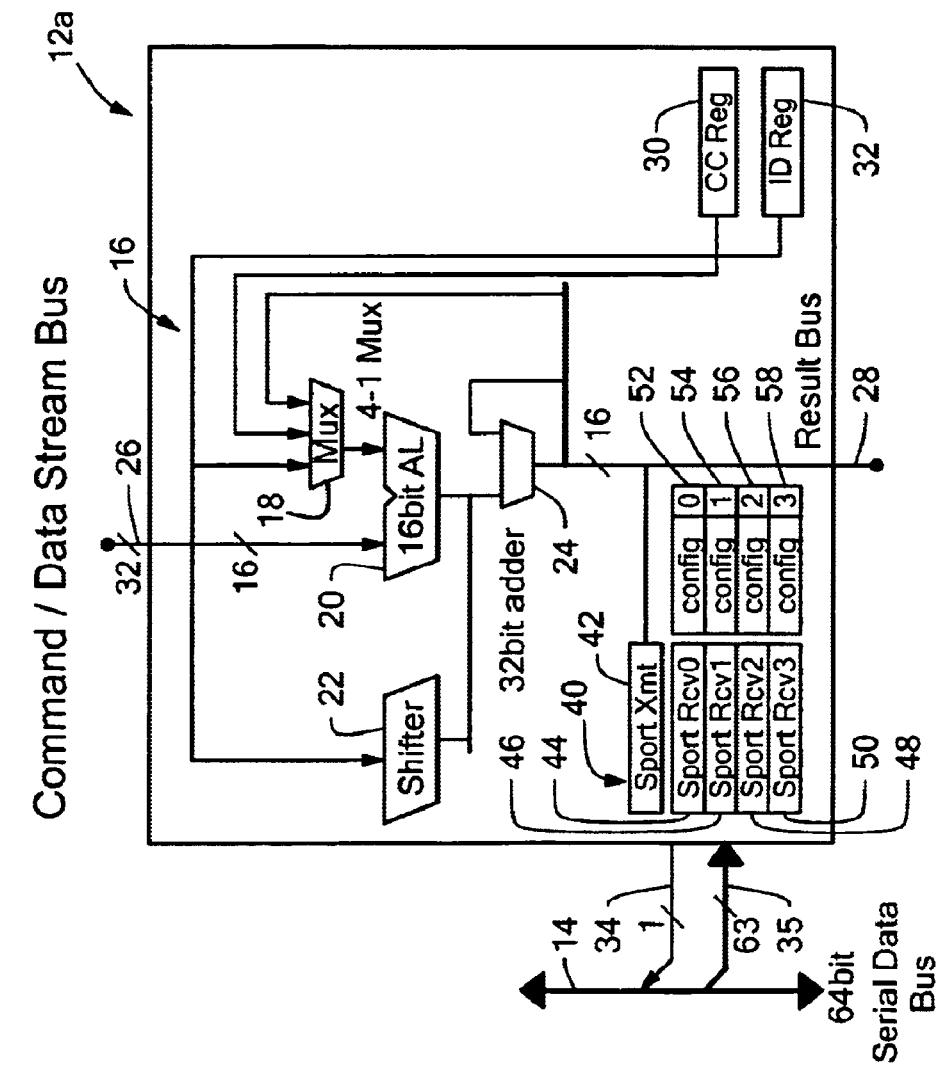
FIG. 2

US 6,865,661 B2

RECONFIGURABLE SINGLE INSTRUCTION MULTIPLE DATA ARRAY

RELATED APPLICATIONS

This application claims priority based on U.S. Provisional application Ser. No. 60/350,398 entitled SINGLE INSTRUCTION MULTIPLE DATA (SIMD) ALU ARRAY to Kablotsky et al., filed Jan. 21, 2002 and U.S. patent application Ser. No. 10/090,941 entitled SINGLE INSTRUCTION MULTIPLE DATA ARRAY CELL to Stein et al., filed Mar. 5, 2002.

FIELD OF THE INVENTION

This invention relates to a reconfigurable single instruction multiple data (SIMD) array.

BACKGROUND OF THE INVENTION

Reconfigurable arithmetic logic unit (ALU) arrays often use ALUs, registers, and memory interconnected by crossbar switches in order to allow reconfiguring for different applications. This approach requires a substantial amount of bus wiring. Another problem with these arrays is that it requires significant time to reconfigure all of the crossbar switches when changing from one hardware configuration to another. One of the most demanding processing tasks is that involving Viterbi decoding algorithm, an efficient implementation of a maximum likelihood sequence estimator using convolutional codes. In viterbi decoders, convolutionally coded symbols that are received possibly corrupted by noise, are compared with all possible expected symbols, using a specific metric (Hamming distance or Euclidean distance). The possible symbols expected depend upon the data to be decoded and the initial state of the convolutional encoder. The Viterbi decoder attempts to find the most probable set of "states" and the most probable possible input to the encoder. If K is the Viterbi decoder constraint length, then the Viterbi decoder algorithm has $2^{k-1}$ states for each symbol. Two or more paths emanate from each state at time n to two or more states at time n+1. For each of those paths, a value has to be added to a metric accumulator. The value is a function of the received symbol and the expected symbol along the path. At each state at time n+1, two or more paths merge. The Viterbi decoder algorithm has to select the one with the higher metric, and it has to record this decision. The Viterbi decoder has to make such a decision for each received symbol for each of the $2^{k-1}$ states. Often the implementation for these applications is dedicated hardware, application specific integrated circuits (ASICs). These are not only expensive and area consuming, they are also able to process only one specific convolutional code. If the hardware is designed for a code with a two parallel transition per state algorithm it can not implement a cell with four parallel transitions (also sometimes referred to hereinafter as "branches") per state. If it is designed for a two branch thirty-two state, it cannot operate on a two branch sixty-four state. And so any versatility comes at the cost of additional ASICs for each different Viterbi algorithm. This approach also requires significant bus wiring. For example, a two branch, sixty-four state Viterbi will need sixty-four processing cells and 64×2 buses with each bus being 8, 16, 32, . . . . lines. Thus, for a thirty-two line implementation there is required a bus line capacity of 2×32×64 or 64 time the number of cells. If a four branch Viterbi is implemented the number of lines needed is 4×32×64 or a hundred and twenty eight times the number of cells. If a two branch one hundred and twenty-eight state Viterbi were to be implemented not only the number of bus lines would be increased, but the number of cells, too, would have to be increased to one hundred and twenty-eight. This increases the power consumption as well. See the Elixent reconfigurable ALU array (RAA) at www.elixent.com. See also the XPP architecture at www.PACTCORP.com.

BRIEF SUMMARY OF THE INVENTION

It is therefore an object of this invention to provide a reconfigurable single instruction multiple data (SIMD) array.

It is a further object of this invention to provide a reconfigurable single instruction multiple data (SIMD) array which is quickly and easily reconfigurable.

It is a further object of this invention to provide a reconfigurable single instruction multiple data (SIMD) array which is reconfigurable in software.

It is a further object of this invention to provide a reconfigurable single instruction multiple data (SIMD) array which is lower in cost, requires less die area, and is faster in processing operations.

It is a further object of this invention to provide a reconfigurable single instruction multiple data (SIMD) array which is quickly and easily reconfigurable to perform many different applications including different Viterbi algorithms.

It is a further object of this invention to provide a reconfigurable single instruction multiple data (SIMD) array which uses a minimum of bus wiring.

It is a further object of this invention to provide a reconfigurable single instruction multiple data (SIMD) array which requires only one line per cell regardless of the application, e.g., two branch or four branch Viterbi.

It is a further object of this invention to provide a reconfigurable single instruction multiple data (SIMD) array which consumes less power.

It is a further object of this invention to provide a reconfigurable single instruction multiple data (SIMD) array which can increase processing capacity by not having a relationship between the number of states and the number of cells, where each cell can process one, two or more states by sharing the same serial transmitter circuit or by having a separate serial transmitter for each state.

It is a further object of this invention to provide a reconfigurable single instruction multiple data (SIMD) array which provides a bus with fixed connection points regardless of reconfiguration.

The invention results from the realization that an improved single instruction multiple data (SIMD) array which is quickly and easily reconfigurable in software rather than actually reconfigurable in hardware and which is smaller, less costly and faster, can be effected by providing for each processing cell an identification number uniquely identifying each cell and its dedicated line in a serial data bus and a communications port having a transmitter circuit which broadcasts its cell's output data over its dedicated line, at least one receiver circuit, and a configuration register associated with each receiver circuit and responsive to the identification number and a common command word to condition its receiver circuit to receive serial input data broadcast from any other cell on that cell's dedicated line.

This invention features a reconfigurable single instruction multiple data array including a plurality of processing cells and a serial data bus with a line dedicated to each cell. Each cell includes an identification number for uniquely identifying each cell and its dedicated line and a communication port including at least one parallel to serial transmitter circuit in each cell for broadcasting its cell's output data over its dedicated line and at least one serial to parallel receiver circuit in each cell. Each cell is responsive to the identification number and a common command word to generate a local configuration command designating a pre-selected broadcasting cell. A configuration register is associated with each receiver circuit and is responsive to the local configuration command to condition its receiver circuit to receive serial input data broadcast from the pre-selected cell's dedicated line.

In a preferred embodiment, each processing cell may include an arithmetic logic unit and a memory. The identification number identifies both a cell and its dedicated line. The identification number may be different from the location of the dedicated line in the parallel line serial bus as long as the two are linearly related. The parallel to serial transmitter circuit may include a shift register. The serial to parallel receiver circuit may include a shift register. The arithmetic logic unit may include an arithmetic logic circuit, an adder and a shifter.

BRIEF DESCRIPTION OF THE DRAWINGS

Other objects, features and advantages will occur to those skilled in the art from the following description of a preferred embodiment and the accompanying drawings, in which:

FIG. 2 is a more detailed schematic diagram of one cell of the array of FIG. 1 illustrating the serial port construction according to this invention;

FIG. 3 is a simplified diagram of a format for the identification register of FIG. 2 according to this invention;

FIG. 4 is a simplified diagram of an illustrative format for the identification register of FIG. 2 according to this invention;

FIG. 5 is is a simplified diagram of the format of a common command word used with this invention;

FIG. 6 is a simplified diagram of the format of a configuration register of FIG. 2;

PREFERRED EMBODIMENT

Figure 1:
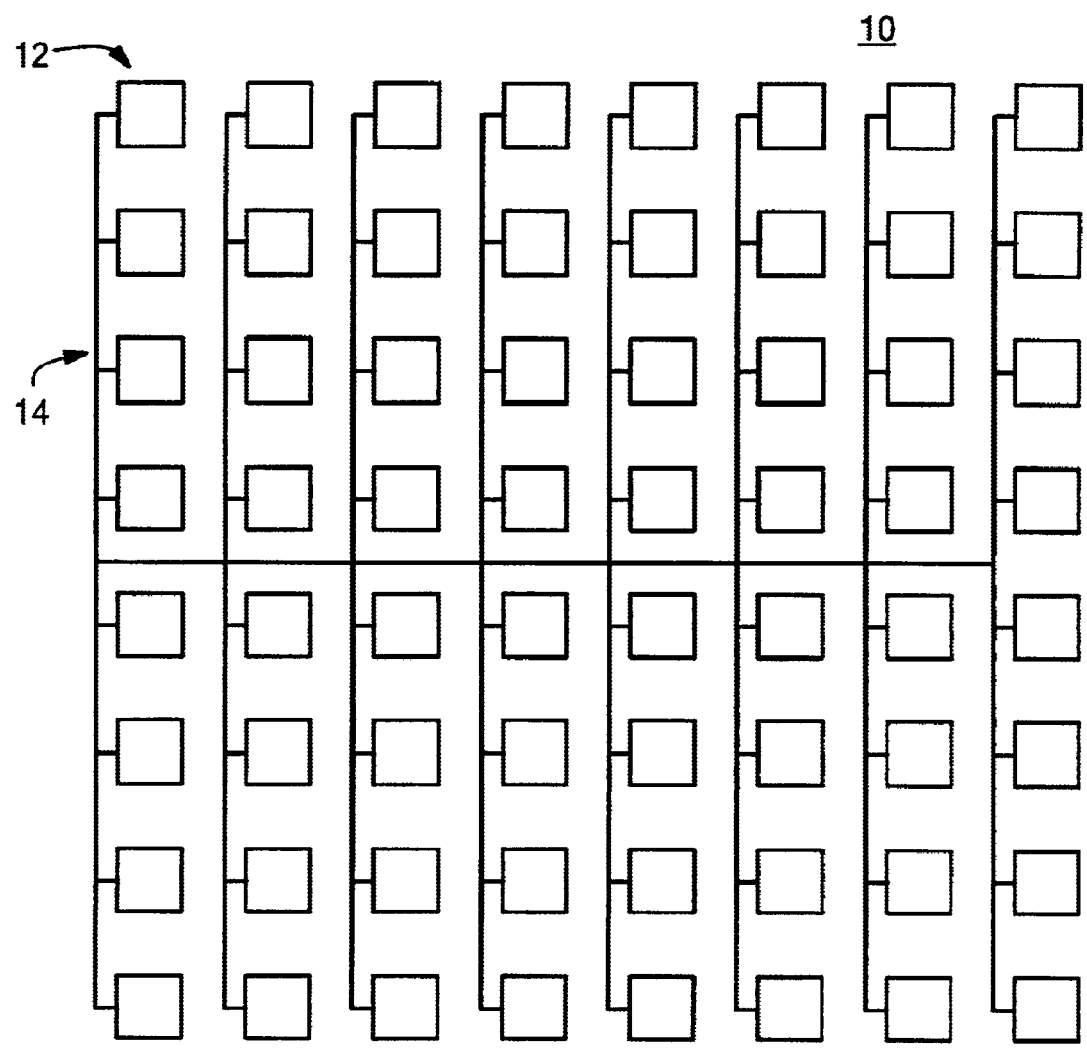
FIG. 1 is a simplified schematic diagram of a single instruction multiple data (SIMD) array according to this invention.

There is shown in FIG. 1 a reconfigurable single instruction multiple data array 10 according to this invention including sixty-four cells 12 arranged in a matrix of eight rows and eight columns. Cells 12 are connected by sixty-four bit serial data bus 14. The other interconnections and components have been omitted for clarity. The sixty-four bit or sixty-four line serial data bus 14 may include as few as one line for each of the cells 12 in array 10. Of course if a serial data bus with more lines are used the number of bits and the speed of operation can be increased. Each cell 12 has one line dedicated to its transmitter port on which it alone broadcasts its output. Each cell 12 receives up to sixty-three inputs from the dedicated lines from each of the other sixty-four cells. This permits an economy of bus size by requiring for each cell only one bit or line in the data bus which is connected to the transmit port of that cell and is dedicated to broadcast the output of that cell. This economy scales so that it applies whether the array is a small four by four sixteen cell array or a large array of 256 or 512 or more cells on a side.

Each cell, as exemplified by cell 12a, FIG. 2, includes an arithmetic logic unit 16 which includes multiplexor 18, arithmetic logic circuit 20, shifter 22, and adder 24 which enables addition and multiplication by shifting as well as accumulation. One input to each cell 12a is the command/data stream input 26. The output or result bus is shown at 28. Also included in cell 12a is a condition code register 30, and identification number register 32. Each cell of cell 12a may include other components such as file registers, memories, and such not here relevant. A fuller explanation of SIMDs is contained in U.S. patent application entitled SINGLE INSTRUCTION MULTIPLE DATA ARRAY CELL to Stein et al., filed Mar. 5, 2002, incorporated herein in its entirety by reference. Condition code register 30 controls the condition of its cell 12a. For example it may cause it to be in an active mode or in sleep mode. Identification register 32 contains a number which uniquely identifies its cell 12a and the particular dedicated line 34 which is unique to this cell. The same mapping relationship between one cell and the location of its dedicated line 34 in the sixty four line serial bus should hold for any other cell in the array. This may be done by having the identification number of cell 12a and dedicated line 34 be the same, as shown in FIG. 3 where a single number stored in ID register 32a is 000000 indicating that line 0 in the sixty four line serial bus is dedicated to the first cell, the second cell and its dedicated line would be 000001, the third cell and its dedicated line would be 000010, the sixty-third cell and its dedicated line would be 111111. Alternatively, ID register 32b may be formatted so that the cell's ID 35 and the dedicated line number 36 are two separate fields so long as the two are linearly related, for as will be explained hereinafter, it is the use of these identification numbers that allows the system to operate efficiently. By linearly related is meant that the same relationship between the cell Id and the cell dedicated line in the sixty four line serial bus for cell with ID=i holds for any other cell with ID=j in the array. This relationship is known and hardwired into the sixty four line serial bus structure. Also included in cell 12a is communication port 40 according to this invention, which includes at least one parallel to serial transmit circuit 42 which may include a register and one or more serial to parallel receiver or circuits 44, 46, 48, and 50 for example. Each of the serial to parallel receiver circuits 44, 46, 48, and 50 may include a register and has associated with it a configuration register 52, 54, 56, and 58, respectively. Although only four serial receiver circuits are shown, any number may be implemented as desired.

Each cell is operated by a common command word 60, FIG. 5, which includes a data field 62, an address field 64, an instruction field 66, and a condition code field 68 which is employed in conjunction with condition code register 30.

In operation, common command word 60 contains an instruction in field 66 that instructs the arithmetic logic unit 16 to perform a particular function on the unique identification number stored in identification register 32 in conjunction with data that is carried in the data field 62 of the same common command word. Thus, for example, in a simplified illustration the instruction can cause the ALU 16 in each cell 12 to increase its identification number by one or two or some number carried in the data field; that number is then installed in configuration register 52 for example and causes the serial port receiver 44 to look for the dedicated line in the sixty-three input lines 35 which is identified in configuration register 52. Each configuration register as indicated with respect to configuration register 52, FIG. 6, includes a slot field 70 and an enable field 72. The operation of the arithmetic logic unit 16 under instruction of the common command word 60, FIG. 5, results in a particular number which is stored in slot field 70, a number there plus the activation of the enable bit 72 when present or when loaded in configuration register 52 becomes a local configuration command which causes serial port receiver 44 to seek the specific dedicated input line 35 that has been identified in slot field 70.

Figure 7:
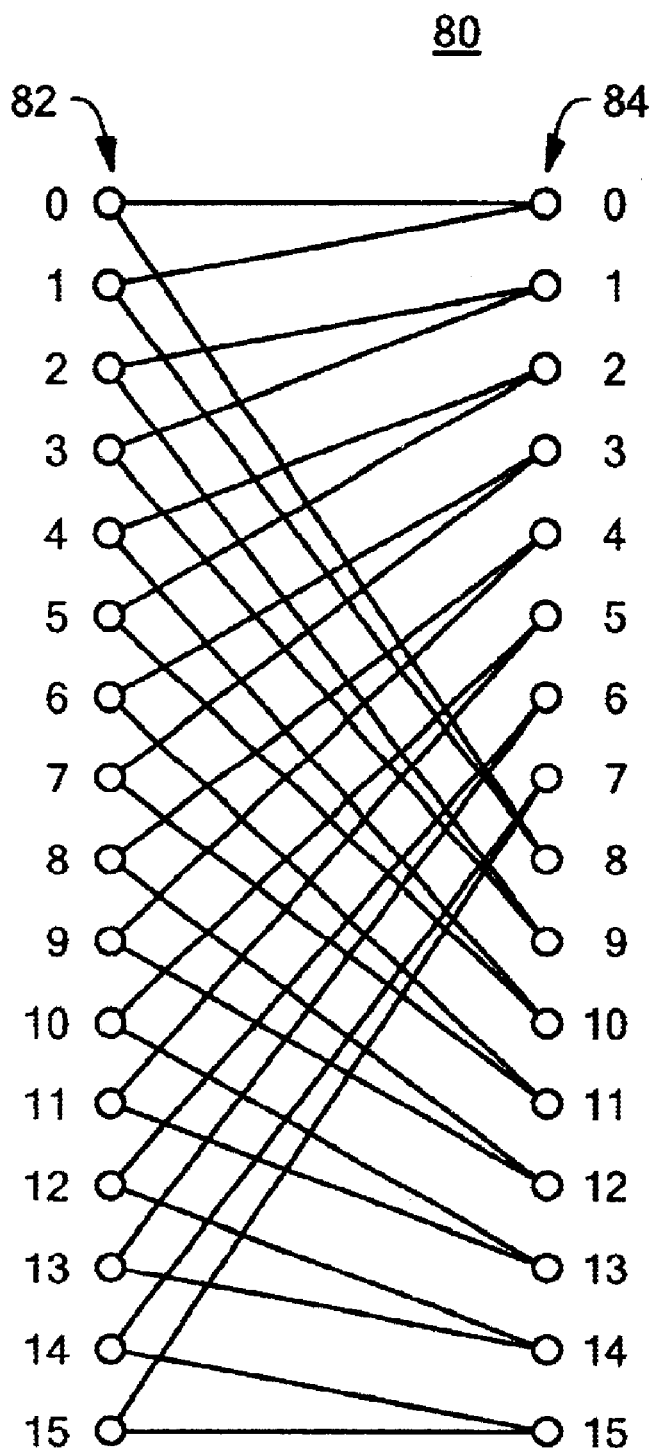
FIG. 7 is a simplified diagram of a two transition (branch) sixteen state Viterbi trellis.
Figure 8:
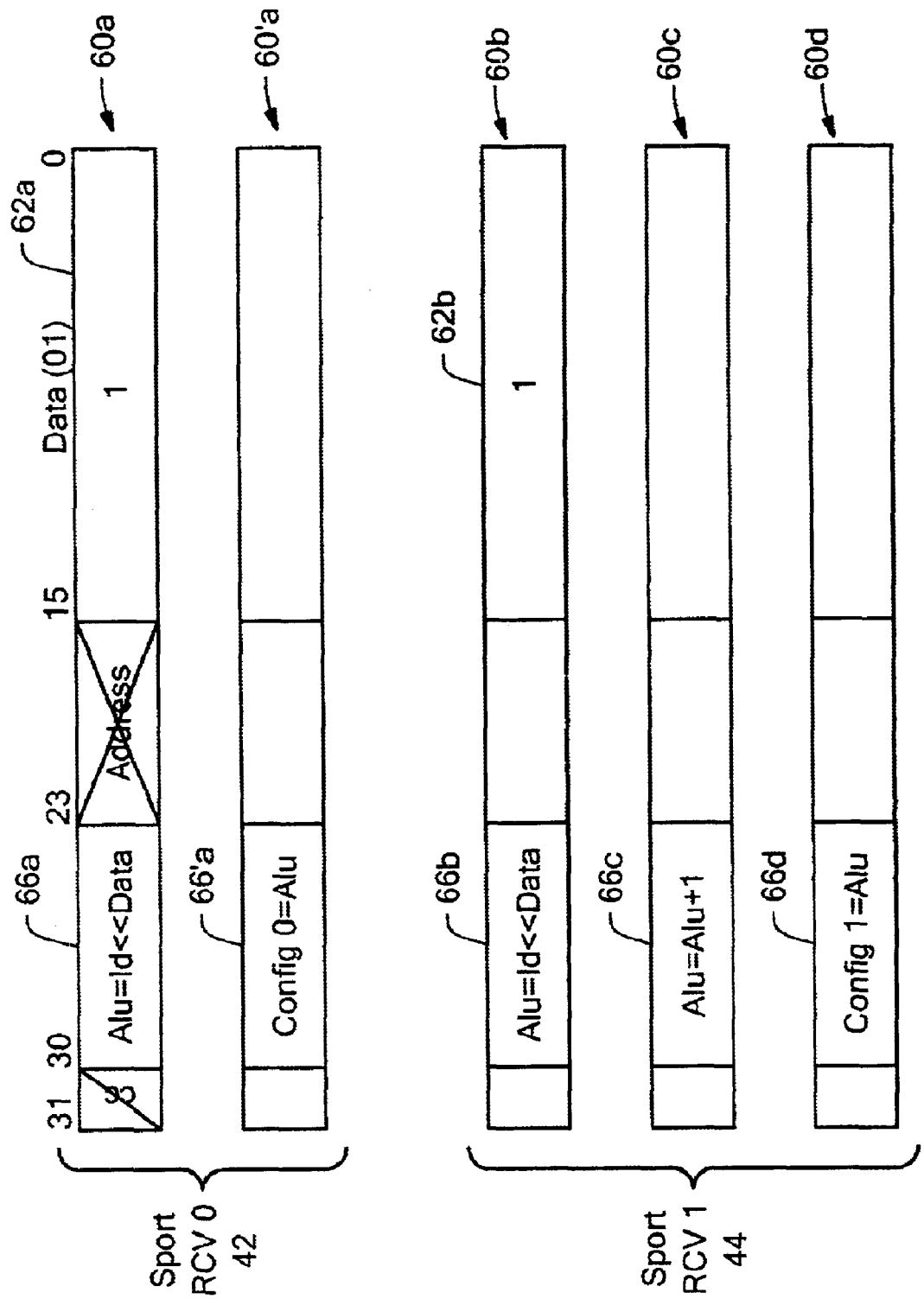
FIG. 8 is a simplified diagram of a series of common command words for establishing the connections for the first and second states of a two transition (branch) sixteen state Viterbi trellis
Figure 9:
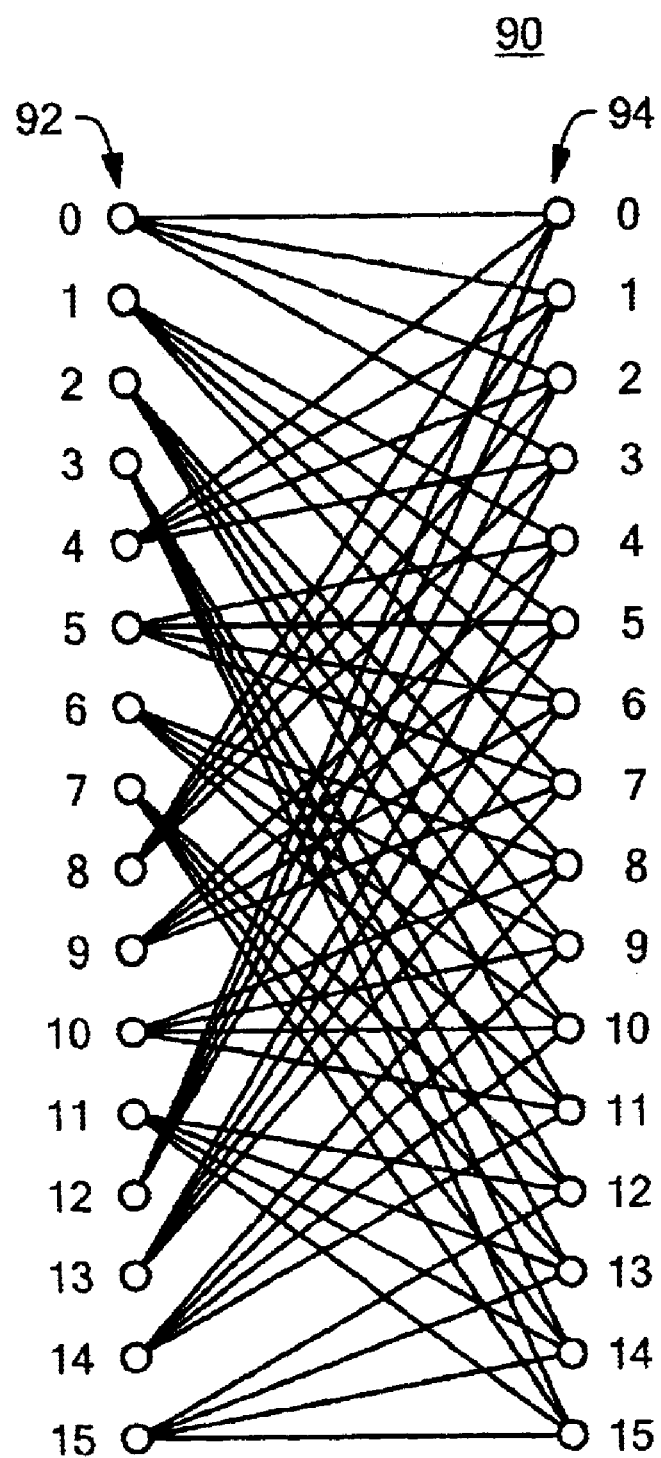
FIG. 9 is a simplified diagram of a four transition (branch) sixteen state Viterbi trellis.

An example with respect to this specific application, namely a Viterbi algorithm, is illustrative. The Viterbi trellis 80, FIG. 7 represents a two branch, sixteen state Viterbi algorithm which has sixteen inputs 82 and sixteen states 84. It can be seen that in each state 84 has two inputs or branches. For example, state 0 is connected to inputs 0 and 1, state 1 is connected to inputs 2 and 3, state 2 is connected to inputs 4 and 5 and so on as observable from FIG. 7. Assuming that cell 12a in FIG. 2 is cell 0 and represents state 0, it must be programmed so that it is connected to input 0 and input 1. That is it must be connected to the dedicated line 0 and the dedicated line 1. To do this its serial port receiver 44 and serial port receiver 46 should be set to look at and only at the dedicated lines from inputs 0 and 1, respectively. This is done beginning with common command word 60a, FIG. 8, where the instruction field carries the instruction (ALU=Id<<data) and the data field 62a contains the data 1. This instructs the ALU to shift the identification number which is 0 by the number in the data field 62a, which is the number 1 that effectively multiplies its Id by 2 (Alu=Id *2). The result is carried in the instruction field 66a' of instruction word 60a' is Config0=ALU. That is, the output of the ALU is the number that will be loaded into the configuration register 52. Loading that number which is 0 in serial port receiver 44 connects state 0 of trellis 80 to input 0. To set up serial port receiver 1, 46, common command word 60b, FIG. 8, in its instruction field 66b, contains the instruction (ALU= Id<<data) and in its data field 62b, contains the number 1. This causes the ALU to perform the one shifts (effectively Alu=Id *2). The result of the new number coming out of the ALU is incremented by 1 by command word 60c to become the new ALU output (Alu=Id*2+1). The final ALU output Config1 instructs that the final ALU output be loaded into configuration register 54. This causes serial port receiver 1, 46, to connect the 0 state or 0 cell 12a to the 1 input. It can be seen that the same SIMD instruction sequence used to program 0 state to receive its data from dedicated line 0,1 will also program 1 state to receive its data from lines 2,3. 2 state to receive its date from 4,5, forming a 16 states trellis connection between the cells. Furthermore, It can be seen that this method can be applied to meet any required pattern of inputs and outputs easily by reconfiguring in software rather than actually reconfiguring through switches and hardware. For example, for a four branch, sixteen state Viterbi algorithm 90, FIG. 9, each of the sixteen states 94 are mapped to four other inputs 92. In that case, the instructions of command word 60 will use all four serial port receivers 44–50 programmed by the common command word 60 through the instructions

```
Config0 = (Id>>2)        // Config0 = Fix(Id/4)
Config1 = (Id>>2)+4      // Config1 = Fix(Id/4)+4
Config2 = (Id>>2)+8      // Config2 = Fix(Id/4)+8
Config3 = (Id>>2)+12     // Config3 = Fix(Id/4)+12
```

Figure 10:
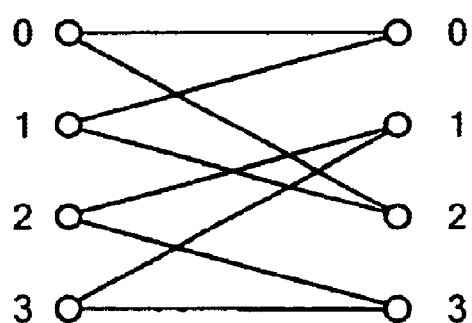
FIG. 10 is a simplified diagram of a two transition (branch) four state Viterbi trellis.
Figure 11:
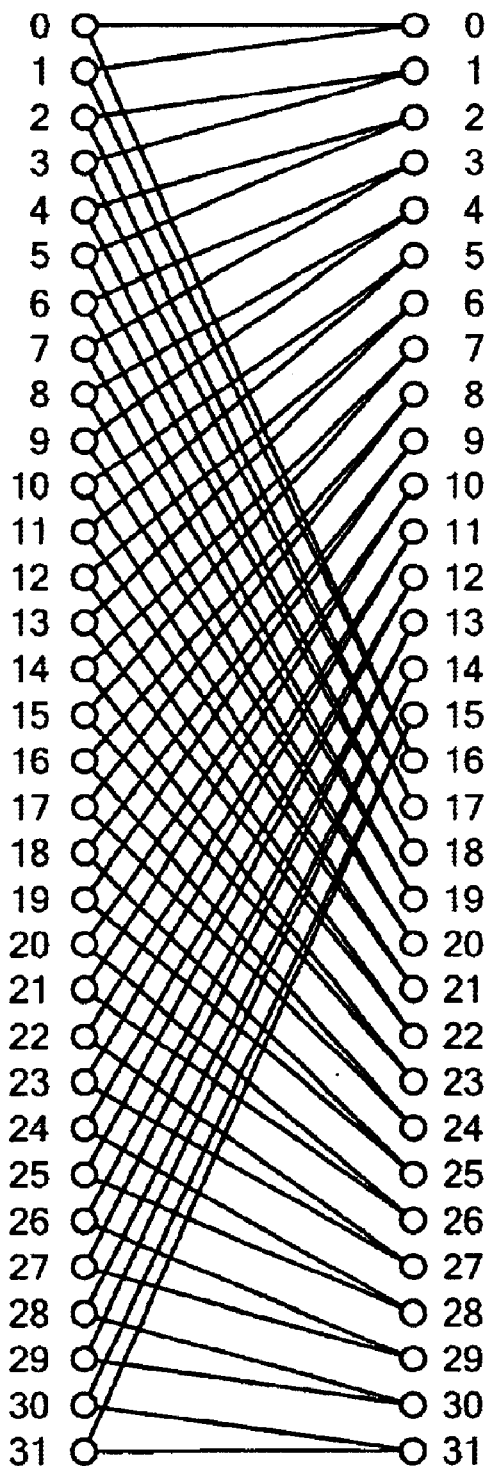
FIG. 11 is a simplified diagram of a two transition (branch) thirty-two state Viterbi trellis.

Thus the reconfigurability afforded by this invention is not just easily and quickly implementable, but is also extremely versatile. For example, it could easily accommodate switching between the two branch, sixteen state Viterbi trellis 80 in FIG. 7 and the four branch sixteen state Viterbi trellis 90 shown in FIG. 9 as well as the two branch four state trellis 100, FIG. 10 and the two branch, thirty-two state trellis 102 in FIG. 11. And, Viterbi combinations are some of the more difficult ones. The reconfigurable SIMD array of this invention is even more adept at adjusting to other types of convolutions and transformation such as filtering, matrix multiplication, and the like.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A reconfigurable single instruction multiple data array comprising:
   a plurality of processing cells;
   a serial data bus with at least one line dedicated to each cell;
   each cell including;
      an identification number for uniquely identifying each cell and its dedicated line, and
      a communication port including;
         at least one parallel to serial transmitter circuit in each cell for broadcasting its cell's output data over its dedicated line;
         at least one serial to parallel receiver circuit in each cell; and
         each cell responsive to said identification number and a common command word to generate a local configuration command designating a pre-selected broadcasting cell; and
   a configuration register associated with each said receiver circuit and responsive to said local configuration command to condition its receiver circuit to receive serial input data broadcast from said pre-selected cell's dedicated line.

2. The reconfigurable single instruction multiple data array of claim 1 in which each said processing cell includes an arithmetic logic unit and a memory.

3. The reconfigurable single instruction multiple data array of claim 1 in which said identification number includes one number which identifies both a said cell and its said dedicated line.

4. The reconfigurable single instruction multiple data array of claim 1 in which said identification number, and the numerical location of the cell's dedicated line in a parallel line serial bus are linearly related.

5. The reconfigurable single instruction multiple data array of claim 1 in which said parallel to serial transmitter circuit includes a register.

6. The reconfigurable single instruction multiple data array of claim 1 in which said serial to parallel receiver circuit includes a register.

7. The reconfigurable single instruction multiple data array of claim 2 in which said arithmetic logic unit includes an arithmetic logic circuit, an adder and a shifter.

* * * * *